United States Patent [19]
Shearer, Jr. et al.

[11] Patent Number: 5,956,507
[45] Date of Patent: Sep. 21, 1999

[54] DYNAMIC ALTERATION OF OPERATING SYSTEM KERNEL RESOURCE TABLES

[76] Inventors: Bennie L. Shearer, Jr., 1306 Carolyn, Humble, Tex. 77338; Mark A. Carpenter, 17920 Stoney Glade Ct., Houston, Tex. 77095

[21] Appl. No.: 08/648,327

[22] Filed: May 14, 1996

[51] Int. Cl.$^6$ ............................................... G06F 9/00
[52] U.S. Cl. .................................... 395/674; 395/670
[58] Field of Search ..................... 395/674, 500, 395/653, 670, 672; 364/232.3

[56] References Cited

U.S. PATENT DOCUMENTS

| | | | |
|---|---|---|---|
| 5,327,560 | 7/1994 | Hirata et al. | 395/200.51 |
| 5,515,525 | 5/1996 | Grynberg et al. | 395/500 |
| 5,634,072 | 5/1997 | Allen et al. | 395/674 |

*Primary Examiner*—Majid A. Banankhan

[57] ABSTRACT

A method to dynamically alter the availability or characteristics of specified system resources (e.g. interprocess communications facilities or tuning variables that control operating efficiency) is described. The inventive method is unique in that it allows the modification of system resources without the need to rebuild and re-initialized (i.e., reboot) the operating system. If required by the specific alteration being performed, creation of new kernel control structures may require that one or more of a kernel's static-type data structures be converted to dynamic-type data structures.

7 Claims, 12 Drawing Sheets

```
AlterKernelVariableMaximumAllowed ( new_value )
{
/*
** Use the existing kernel lock to control access to
** the resource being modified.
*/
    acquire_lock_exclusive ( Kernel_Subsystem_Lock );

kernel_control_variable = new_value;

release_lock ( Kernel_Subsystem_Lock );

return;
}
```

FIG. 5

```
AlterNumberKernelIdentifiers ( new_value )
{

/*
** Acquire a new lock to control access to the ID
** mapping table that intercept hooks will also acquire
** before proceeding.  Any new kernel requests after
** the intercept hooks are planted will be held
** in abeyance on the new lock until after the new
** environment is established.  In this way, any kernel
** control operations will either see the old
** environment or the new environment via the intercept
** hooks.
*/ acquire_lock_exclusive ( NEW_target_subsystem_lock );

acquire_lock_exclusive ( Kernel_Subsystem_Lock );
  /* existing kernel lock */

/*
** Make sure the intercept function hooks are planted in
** the appropriate places to invoke the hooked routines
** before any vendor (operating system) supplied ones.
*/
  if ( kernel function routine(s) have not
      previously been installed)
  {
    for ( each hook required )
    {
      saved_kernel_routine_address =
                     kernel_routine_branch_address;

kernel_routine_branch_address =
                     new_intercept_function_address;
    }
  }
```

FIG. 6A

```
/*
** Create a new kernel table (with associated IDs) and
** new map from the currently in use kernel table
** entries.
*/
  new_kernel_ID_map_table_address =
                allocate_storage ( size );

initialize new_kernel_ID_map_table ();

new_kernel_table_address = allocate_storage ( size );

for ( each entry in the old_kernel_table )
  {
    if ( old kernel_table_entry is in use )
    {
      copy ( old_kernel_table_entry to
                  new_kernel_table_entry );

if ( old_kernel_ID_map_table entry exists
                  for this entry )
      {
        new_kernel_ID_map_table_entry.old_id =
                  old_kernel_ID_map_table_entry.old_id;
        new_kernel_ID_map_table_entry.new_id =
                  new_kernel_table_entry_ID;
      }
      else
      {
        new_kernel_ID_map_table_entry.old_id =
                  old_kernel_table_entry_id;
        new_kernel_ID_map_table_entry.new_id =
                  new_kernel_table_entry_id;
      }
    }
  }
}
```

FIG. 6B

```
/*
** Step through the new_kernel_ID_map_table making sure
** that no new IDs are the same as existing old IDs.  Any
** conflicts will have the new ID adjusted until it is
** unique.
*/ for ( each entry in the new_kernel_ID_map_table )
    {
      if ( new_kernel_ID_map_table_entry.new_id equals
             any old_kernel_ID_map_table_entry.old_id )
      {
        do
        {
          new_kernel_table_entry_id =
                 next_valid_kernel_table_entry_id;
        }until ( new_kernel_ID_map_table_entry.new_id is
                                    unique );
      }
    }

/*
** If there are deferred execution control elements (e.g.
** processes, threads, tcb's, vmbloks, etc. ) associated
** with an in use kernel table entry, then their saved data
** areas need to be updated to conform with the altered
** kernel resource information.
*/ for ( each in use entry in the new_kernel_table )
    {
      if(deferred execution_control_elements on this entry )
      {
        alter_saved_execution_element_data(old_data,new_data);
      }
    }
```

FIG. 6C

```
/*
** Return any no longer needed free storage to the system,
** if that's where it was acquired from.
**
** Update the kernel variables with the information that
** identifies the altered kernel resource contrl
** information.
*/ if ( old_kernel_table was from free storage )
{
  return_free_storage ( old_kernel_table );
} kernel_table = new kernel_table;

if ( there was a previous mapping
     table(old_kernel_ID_map_table) )
{
  return_free_storage ( old_kernel_ID_map_table );
} saved_kernel_ID_mapping_table_address =
              new_kernel_ID_map_table;

kernel_number?of_IDs_variable = new_value;

release_lock ( Kernel_subsystm_Lock );

release_lock ( NEW_target_subsystem_lock );

return;
}
```

FIG. 6D

```
AlterNumberKernelIdentifiersStatic ( new_value )
{

/*
** Acquire a new lock to control access to the ID mapping
** table that the intercept hooks will also acquire before
** proceeding.  Any new kernel requests after our intercept
** hooks are planted will be held on abeyance on the new
** lock until the new environment is established.  Thus, any
** kernel control operations will either see the old
** environment or the new environment via the new intercept
** hooks.
*/ acquire_lock_exclusive ( NEW_target_subsystem_lock );

acquire_lock_exclusive ( Kernel_Subsystem_Lock );
                              /* existing kernel lock */
/*
** Make sure intercept function hooks are planted in the
** appropriate places to invoke the intercepting routines
** before the vendor (operating system) supplied fuctions.
*/ if ( kernel function routine hook(s) have not previously
       been installed )
  {
    for ( each hook required )
    {
      saved_kernel_routine_address =
                  kernel_routine_branch_address;

kernel_routine_branch_address =
                  new_intercept_function_address;
    }
  }
```

FIG. 7A

```
/*
** Create a new kernel table (with associated IDs) and the
** new map ** from the currently in use kernel table
** entries.
*/ new_kernel_ID_map_table_address = allocate_storage (size) ;

initialize new_kernel_ID_map_table( ) ;

new_kernel_table_address = allocate_storage( size ) ;

for( each entry in the old_kernel_table )
  {
    if( old_kernel_table_entry is in use )
    {
      copy(old_kernel_table_entry to new_kernel_table_entry) ;

if ( old_kernel_ID_map_table entry exists for
          this entry )
      {
        new_kernel_ID_map_table_entry.old_id =
                    old_kernel_ID_map_table_entry.old_id;
        new_kernel_ID_map_table_entry.new_id =
                    new_kernel_table_entry_ID;
      }
      else
      {
        new_kernel_ID_map_table_entry.old_id =
                    old_kernel_table_entry_id;
        new_kernel_ID_map_table_entry.new_id =
                    new_kernel_table_entry_id;
      }
    }
  }
}
```

FIG. 7B

```
/*
** Step through the new_kernel_ID_map_table_ making sure that
** no new IDs are the same as existing old IDs. Any
** conflicts will have the new ID adjusted until it is
** unique.
*/ for( each entry in the new_kernel_ID_map_table )
   {
     if( new_kernel_ID_map_table_entry.new_id equals
       any old_kernel_ID_map_table_entry.old_id )
     {
       do
       {
         new_kernel_table_entry_id =
                   next_valid_kernel_table_entry_id;
       }until ( new_kernel_ID_map_table_entry.new_id is
                                       unique ) ;
     }
   }

/*
** If there are deferred execution control elements (e.g.
** processes, threads, tcb's, vmbloks, etc. ) associated
** with an in use kernel table entry, then their saved data
** areas need to be updated to conform with the altered
** kernel resource information.
*/ for( each in use entry in the new kernel table )
   {
     if (deferred execution_control_elements on this
                                       entry exist)
     {
       alter_saved_execution_element_data(old_data,new_data);
     }
   }
```

FIG. 7C

```
/*
** If this is the first time the resource control table has
** been altered then static table is being changed to a
** dynamic table.  There are assembler instructions that
** need to be modified to correctly reference the (now)
** dynamic table.
*/ if( static to dynamic conversion has not been done for
                           this table )
    {
      for( each assembler instruction opcode that needs to
                           be changed )
      {
        locate_virtual_address_assembler_instruction() ;
        verify_assembler_instruction () ;
        convert_assembler_instruction_opcode () ;
        locate_physical_address_assembler_instruction () ;
        update_physical_address_assembler_instruction () ;
      }
    }
/*
** if in-line code paths have not been implemented, then
** insert in-line code hooks
*/ old_kernel_table.dynamic_pointer_location =
                    new_kernel_table_address;
```

FIG. 7D

```
/*
** Return any no longer needed free storage to the system,
** if that's where it was acquired from.
**
** Update the kernel variables with the information that
** identifies the altered kernel resource control
** information.
*/ if( old_kernel_table was from free storage )
  {
    return_free_storage( old_kernel_table ) ;
  } if( there was a previous mapping
table(old_kernel_ID_map_table) )
  {
    return_free_storage( old_kernel_ID_map_table ) ;
  } saved_kernel_ID_mapping_table_address =
                new_kernel_ID_map_table;

kernel_number_of_IDs_variable = new_value;

release_lock( Kernel_subsystm_Lock ) ;

release_lock( NEW_target_subsystem_lock ) ;

return;
}
```

FIG. 7E

DYNAMIC ALTERATION OF OPERATING SYSTEM KERNEL RESOURCE TABLES

1. BACKGROUND OF THE INVENTION

The invention relates in general to the field of computer software optimization and, more particularly, to run-time alterations in operating system resource allocation data. Specifically, the invention describes a method for dynamically altering operating system kernel resource control tables without the need to shut-down and reboot the computer system to invoke the changes.

An application executing under the control of, for example, the Unix operating system requests the use or allocation of resources controlled by the kernel through a mechanism known as a system call. The system call technique provides a standard interface in all currently available Unix variants and is essentially a branch table indexed by the function being requested. See FIG. 1. A non-exhaustive set of system call examples include open a file, close a file, allocate memory, perform an input-output (I/O) operation, and allocate or use an interprocess communication resource such as a message queue, semaphore, or shared memory.

As part of the processing of a system call, special kernel program code switches the state of the operating environment from that of the application (commonly referred to as user mode, problem state, or protected mode) to a state required by the kernel to accomplish its control tasks (commonly referred to as kernel mode, supervisor state, or privileged mode). It then indexes into the branch table (commonly called a system table 100), extracts the address 105 of the routine to process the requested function, and calls the routine 120 at that address to perform the requested function. When the kernel function 120 has completed its processing, it returns its result(s) and control back to the operating environment (e.g., user or protected mode) of the application that originated the system call.

1.1 Resource Allocation

In a specific example a system call is executed to allocate, control, update or manipulate, and release resources associated with semaphores, shared memory and message queues which are collectively known as interprocess communications (IPC) facilities. In the allocate functions, such as Unix's semget, shmget, and msgget, the application making the IPC resource request submits a key with which to uniquely identify the resource and any information required to define or initialize the resource (e.g. size of shared memory segment, number of semaphores, and access permissions). In response to the request, the kernel generates and returns an identifier, referred to as a kernel identifier, which is used by the calling application in all further references to the resource or resource set; those resources allocated during the allocate process. (A kernel identifier is, generally, a numeric value returned to an application program, from the kernel, that identifies a specific resource element. For example, if an application program requests a shared memory segment from the kernel, the returned kernel identifier identifies the specific resource control blocks for that shared memory segment.) In all subsequent actions or control functions executed against the allocated resource, the kernel identifier is submitted as a parameter in the system call to identify the target resource set to the kernel.

As part of the allocation process, the kernel makes several determinations on the "get resource" request. If no resource is currently in existence for the submitted kernel identifier, the kernel attempts to allocate the requested resource by determining if there is a sufficient quantity of the resource available to satisfy the request and a free control structure (commonly known as semid_ds, shmid_ds, or msqid_ds) in the kernel to represent the resource set. For each resource, there is a preset system-wide limit of the number of these control structures (and therefore kernel identifiers) that can be active at any one time. If a control structure is available, then it is initialized using the information provided in the system call parameter list and a kernel identifier is generated based on which control structure was found available.

If, on the other hand, the application executes a system call using a kernel identifier that is already associated with a resource (e.g., resource control structure), the kernel perform is a validation process to ensure the calling application is authorized to use the identified resource. If it is, the kernel identifier already assigned to the referenced resource is returned to the application. In this way, many applications can share a resource.

1.2 Allocation of Kernel Control Structures

Kernel control structures are generally organized into arrays or tables herein referred to as resource control tables. Because the number/quantity of any specified resource is known at system startup time, resource control tables may be created as static or dynamic memory elements. That is, a resource control tables memory allocation is defined in such a way as to make its location and size constant.

Static allocation is realized in the way a particular structure (e.g., resource control table) is defined in the kernel's program. For example, in the C programming language, a static array/table can be created by defining an instance of a structure array in the global data space by using the following statement:

struct sample { int a; int b;} sampletable [100];

This statement creates a static array identified by the name 'sampletable' having 100 elements, where each element is of type 'sample.' As would be well known to those of ordinary skill, this type of array can be defined using other programming languages using definition statements that are equivalent in function to those stated here for the C programming language.

Key aspects of the sampletable structure (see FIG. 2) created using static allocation techniques include: (1) it is created in the compile or assembly phase of program development; (2) table initialization, if any, is done during the compile or assembly phase as well; (3) the table's location in memory is determined by references to the array name sampletable 200; (4) the table's memory space is part of the executable object 205 and cannot be released or reused; and (5) the compiler, or assembler, will have placed other data elements of global scope around this structure array, 210 and 215, rendering it impossible to increase the number of elements in the array while leaving it at the same location in the executable program.

Dynamic allocation, in contrast, is performed at run-time, i.e., during program execution. In this method, definition of the 'sampletable' data structure takes the form of a pointer in the program, where only the pointer is defined at compile or assemble time. Only at program execution, such as during program startup or when the array is first referenced, would the sampletable structure be initialized. Typically, initialization can take the form of a call to a free storage management routine (such as malloc or calloc) provided by the operating environment to acquire the address of a section of memory large enough to hold an array of the desired number of elements. The address of the memory section would be placed into the pointer variable, referenced by the name sampletable. References to the array would thereafter be accomplished by using the address contained in the pointer variable (array name). Again using the C programming language as an example, this could be accomplished with the following code fragment:

struct sample *sampletable;
    sampletable=(sample *) malloc(100 * size of(sample))

Key aspects of the sampletable structure (see FIG. 3) created using dynamic allocation techniques include: (1) the only storage reserved during the compile or assembly phase is for the pointer to the array sampletable 300; (2) storage for the array sampletable is not part of the executable module 305 loaded at run-time; (3) storage for the sampletable array must be acquired and initialized during execution of the program if sampletable is to be used during program execution; (4) location of the dynamic array in memory 310 is determined only by the contents of the pointer variable (sampletable 300); and (5) the location and size of the array 310 can be altered by controlling access to the pointer variable while its contents are updated to reference a different memory location containing an array with a different number of elements.

Kernel control structures are normally stored in contiguous tables or arrays with the table initialized to contain the number of structures defined by a system-wide limit value; kernel control structures may be statically defined data structures. While the method of generating resource identifiers varies slightly between various kernel implementations, in substantially all cases the position of the selected structure in the array (its index) and a sequence number maintained in each control structure are inputs to the function that generates the kernel identifier. This implies that changing the system-wide limit of kernel identifiers for any given resource affects the use of all the kernel identifiers currently in use by application programs in the system.

1.3 Drawbacks to Prior Art Resource Management

There are a number of undesirable constraints placed on users or applications due to the conventional implementation described above. The first being that any tuning desired to make a Unix kernel operate more efficiently under a given workload (set of applications or users executing at the same time), requires a system outage be endured by all users. Consequently all applications executing prior to the change in system resource capabilities will require restarting.

It would be beneficial to be able to alter kernel tuning parameters without an outage of services in order to improve the efficiency or even to determine what settings provide the optimum efficiency. Further it would be beneficial to be able to alter the quantity of certain resources available to users/applications (e.g. IPC facilities) dynamically; either to increase the quantity of a resource to allow more users/applications to utilize the benefits of that resource or to decrease availability to conserve or control access to resources in a constrained environment.

2. SUMMARY OF THE INVENTION

A method to dynamically alter the availability or characteristics of specified system resources (e.g. interprocess communications facilities or tuning variables that control operating efficiency) is described. The inventive method is unique in that it allows the modification of system resources without the need to rebuild and re-initialize (i.e., reboot) the operating system.

If required by the specific alteration being performed, entries in the operating system's system call table that are affiliated with the target resource will have their function pointers replaced by function pointers that invoke substitute logic. (This technique is known as "hooking" or "intercepting" the system call.) The function pointed to by the replaced (hooked or intercepted) functions may be required to apply existing rules related to the resource, effect the conversion of old identifiers to new identifiers (this process is referred to as mapping) and/or provide additional synchronization control on access to the subsystem. After any necessary preprocessing, the hooked function branches to the originally called system function where normal kernel processing proceeds. Upon completion, the called system function returns via the hooked function to allow any required post-processing such as synchronization control, and management of map entries.

After gaining the appropriate synchronization primitives, existing information (in the form of kernel control blocks) are altered or duplicated as required to effect the desired modification. If required, mappings are created that will allow for conversion from the original identifier of an element of the resource that is already in use to a new identifier that it will be known as once the alteration has been effected. When the duplicate control structures and mapping tables have been successfully created, the kernel control structures will be altered or replaced by the newly created control structures.

Creation of new control structures may require that one or more of a kernel's static-type data structures be converted to dynamic-type data structures. A method to accomplish this task in a program transparent manner is also described.

3. BRIEF DESCRIPTION OF DRAWINGS

FIG. 5 is an illustrative pseudo-code listing for dynamically altering a system resource control table in accordance with the invention.

FIGS. 6a through 6d comprise a second illustrative pseudo-code listing for dynamically altering a system resource control table in accordance with the invention.

FIGS. 7a through 7e comprise an illustrative pseudo-code listing for dynamically changing a static type data structure to a dynamic type data structure in accordance with the invention.

4. DETAILED DESCRIPTION OF A SPECIFIC EMBODIMENT

For purposes of illustration, a number of specific embodiments of the invention are described below. The description of each embodiment is organized as a claim-like list of features, annotated with explanatory notes. Bracketed numbers are references to explanatory notes, including adaptations and modifications to the specific embodiments that follow. Additional discussion is set out thereafter. It is emphasized, however, that the invention for which patent protection is sought is defined in the claims at the end of this specification. Any correlation between the claims at the end of the specification and the claim-like lists of features of specific embodiments is for purposes of illustration only and is not necessarily to be construed as limiting the claims at the end of the specification.

It will of course be appreciated that in the development of any such embodiment (as in any software development project), numerous implementation-specific decisions must be made to achieve the developers' specific goals, and that these goals will vary from one implementation to another. Moreover, it will be appreciated that such a development effort might be complex and time-consuming, but would nevertheless be a routine undertaking of software engineering for those of ordinary skill having the benefit of this disclosure.

4.1 Introduction

The ability to operate in the kernel environment (kernel mode) is provided by the implementation of a pseudo-device driver installed as an extension to the kernel. The use of pseudo-device drivers is a common technique known to those of ordinary skill. (Many such extensions, in the form of utility functions, are often provided by vendors of Unix kernels and include, for example, /dev/mem and /dev/kmem.) The pseudo-device driver, as an extension to the kernel, has access to all storage locations in the kernel, function logic provided by the standard kernel, synchronization primitives used by the kernel, etc.

Figure 1:
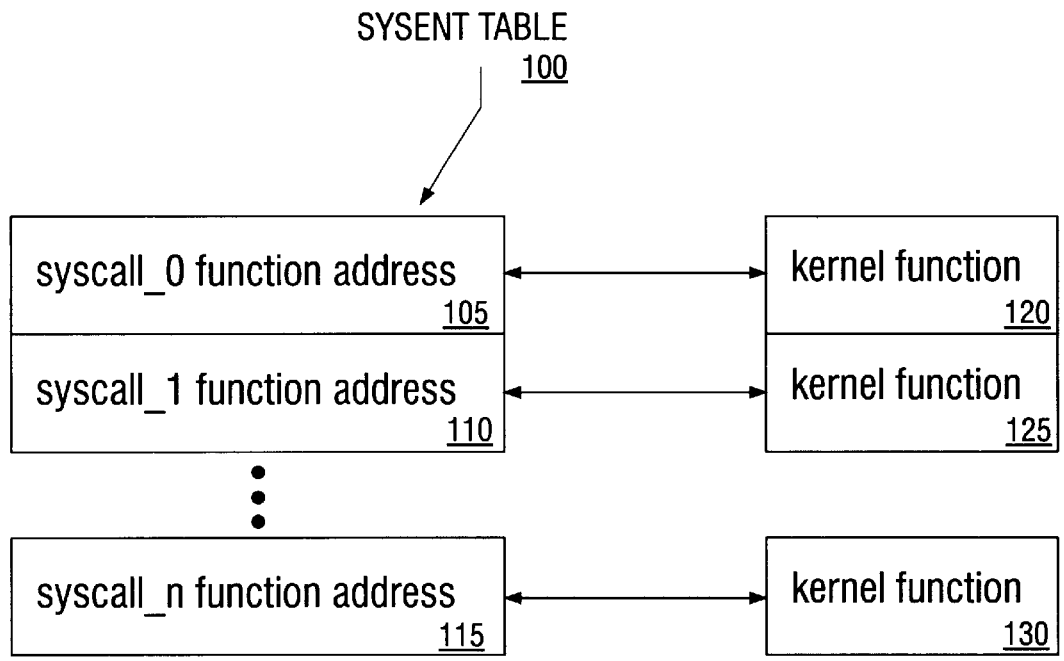
FIG. 1 is a block diagram representation of a Unix like operating system's system table.
Figure 2:
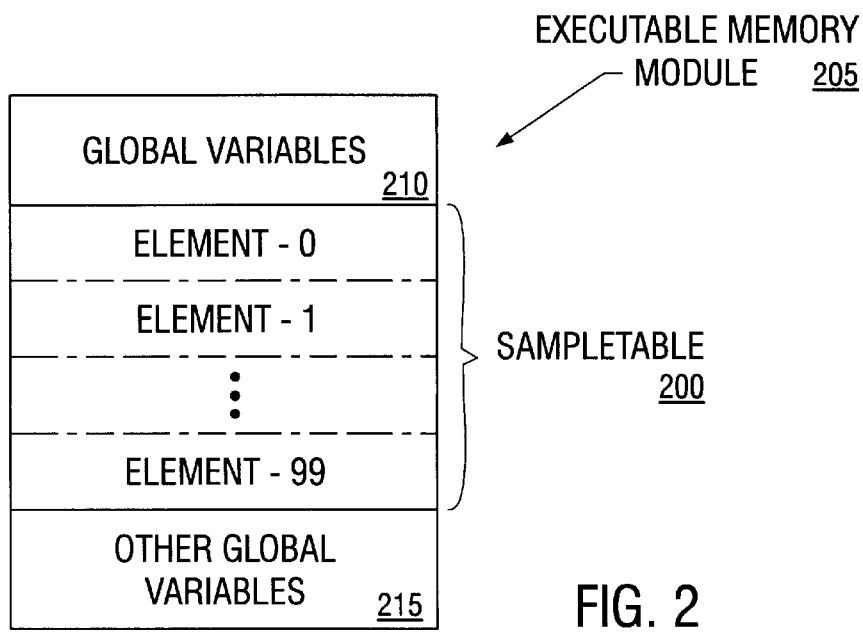
FIG. 2 is a block diagram representation of a prior art executable load module showing a statically defined array or table.
Figure 3:
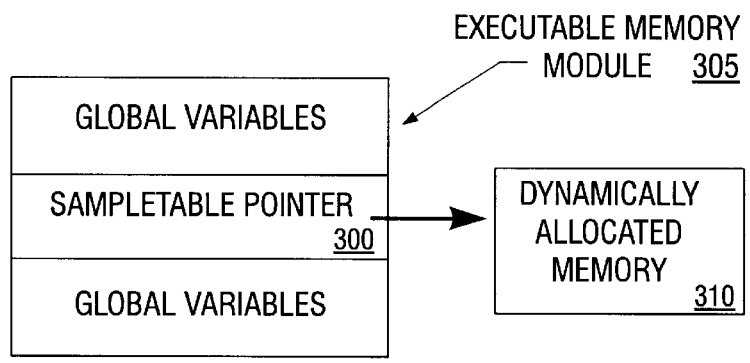
FIG. 3 is a block diagram representation of a prior art executable load module in which a dynamically defined array or table is defined.
Figure 4:
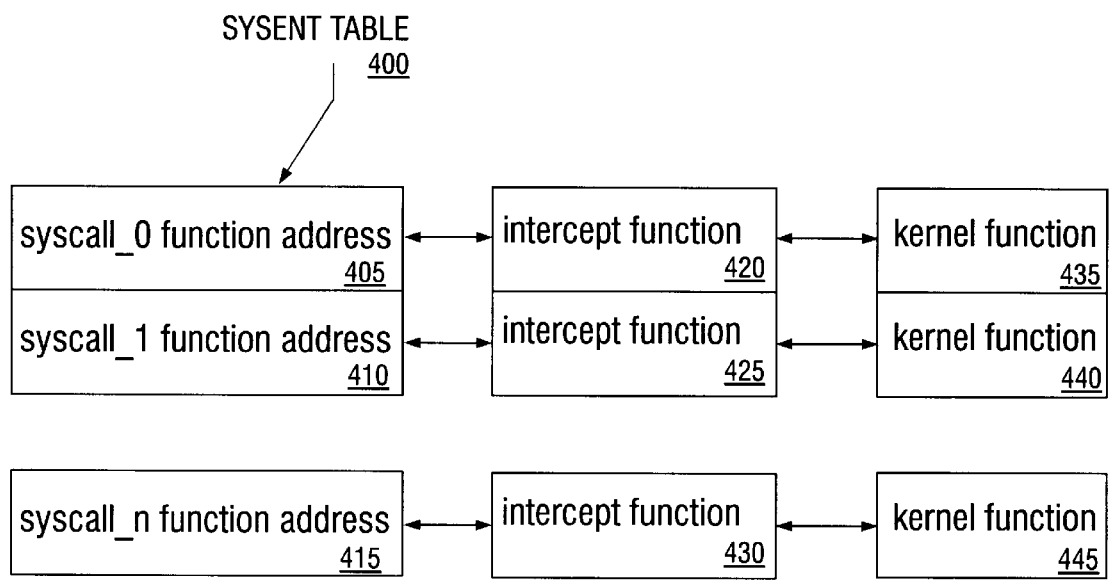
FIG. 4 depicts a system "hooking" or intercepting function as employed by the inventive method.

As a preliminary step to the inventive method, the standard system table is "hooked." See FIG. 4. Hooking the system table 400 means to replace the system call addresses of the system table that would normally point to the targeted kernel function (see FIG. 1, elements 105 and 120) with a pointer to an intercept function (e.g., 420). The intercept function performs any necessary preprocessing such as obtaining necessary system locks before calling the targeted kernel function (e.g., 435). Execution of an intercept function via the system table is known as "intercepting." Upon completion, the kernel function (e.g., 435) returns back through the intercept code (e.g., 420) where further processing such as synchronization control and management of resource map entries (see discussion below) can be performed.

4.2 An Illustrative Resource Control Table Modification Embodiment

A first illustrative embodiment is a computer executed method for dynamically [1] altering one or more Unix operating system kernel resource control tables [2] for a specified subsystem [3] in response to a request from an application program [4]. The method comprising:

(a) imposing a modification-lock [5] on the specified subsystem, (b) creating a new resource control table having a plurality of entries [6], (c) copying those entries in the specified table that represent in-use resource control data [7] to the new resource control table [8], (d) substituting the new resource control table for the specified table [9], and (e) releasing the modification-lock [10].

NOTES

[1] The term "dynamic" means the changes made (by the method) to operating system resource allocation tables are made known to the operating system and thereafter affect its operation without the need to shut-down and reboot the system. This is in contrast to prior art techniques of modifying system resource allocation tables. For example, in standard Unix kernels, to alter the availability of certain resources (e.g. interprocess communications facilities, and tuning variables that control operating efficiency of subsystems) it is required that certain configuration files be edited. Following these edits, the Unix kernel may need to be rebuilt and the operating system shut down and re-initialized (rebooted).

[2] A kernel resource control table is a kernel data structure, typically an array of resource control structures, that is used to define the amount and access control information for the resource's subsystem. Example resource control tables in the Unix environment include, but are not limited to, the inode table, the file table, and IPC interprocess communication tables. Example resource control structures include, but are not limited to, semid_ds, shmid_ds, and msqid_ds. (Those of ordinary skill in the art will recognize there are other kernel resource control tables and resource control structures and further, different operating systems call similarly functional tables/structures by different names.) Each resource control table has one or more entries, and each entry has associated therewith a kernel identifier. As described above, it is the kernel identifier which is used to uniquely identify and control access to, a specified resource.

[3] As described above, exemplary Unix subsystems include, but are not limited to, interprocess communication (IPC) subsystems, input-output (I/O) subsystems, file subsystems, and network communications subsystems. Subsystems are, generally, defined as specialized functional routines that collectively comprise the operating system's kernel.

[4] An application program in this context is defined as any software program that interacts with the operating system's kernel through a system service request branch table. In Unix this is generally known as the system table. In IBM MVS and VM system's this table is known as the SVC branch table. Other operating systems contain similarly functional tables under other names.

[5] A modification-lock can be imposed in at least two ways. The first way is to implement a new shared-exclusive lock that allows one or more application programs to have shared read access to the "locked" subsystem while any operation that modifies the subsystem's resource control tables acquires exclusive access to the subsystem. See the description of a modification-lock below.

A second means of securing a modification-lock is by acquiring one or more existing kernel locks which will sufficiently control access to the specified subsystem resource control tables. As would be known to those of ordinary skill in the art, an exclusive lock prevents any application program, except the program owning the exclusive lock, from writing to the data areas' of the locked subsystem.

[6] For example, to alter the number of kernel identifiers (thereby altering the availability of system resources) in accordance with the invention, one or more new resource control tables (comprised of a plurality of control structures such as, for example, semid_ds structures) are created. A call to a kernel memory management routine (this routine may have various names in different vendor implementations, but is generally known as malloc, calloc, and the like) is made to allocate/create a block of storage in the kernel address space of sufficient size to contain the new resource control table(s), e.g., an array of semid_ds structures.

If necessary, another call will be made to allocate enough free memory to contain a mapping table large enough to contain a translation entry for each kernel identifier currently allowed in the specified subsystem. Additional calls for free memory may be required in some implementations due to the need to duplicate ancillary structures associated with the resource control table's constituent control structures (e.g.

an array of lock primitives for each entry in the resource control table or a hash table for more efficient lookups).

[7] An in-use resource is a resource that the kernel recognizes as having been allocated for use by one or more application programs, regardless of whether any application is currently using said resource.

[8] The specified subsystem's existing resource control table's control structures are processed and for each currently in-use control structure its information is duplicated in the newly created resource control table. A map table entry is created to record the kernel identifier that the duplicated resource control structure was previously known by. This information may be obtained from a previous map table if one had already been in use when the current "alter" function was called or from the original resource control block associated with the specified resource subsystem. Since the kernel name sema is a pointer to a dynamically allocated array in some implementations and the memory location of the beginning of a static array in others, execution of this operation must be cognizant of the fact that an earlier "alter" function may have converted a normally static array into a dynamic array using the techniques described below.

[9] When the copy operation is complete, the new resource control table(s) is substituted for the previous resource control table(s) via the appropriate update of the sema variable. (This operation may require the static to dynamic array conversion and opcode replacement techniques cited above and described below.) It is at this point that an instruction in the existing kernel instruction path may be replaced with a branch instruction (i.e., "hooked") so that any necessary mapping of old control table entries to new control table entries or locking functions may be performed. In general, any pre-processing or post-processing that can be done by hooking the system table, may also be done with in-line code hooks.

If there were structures ancillary to the originally existing resource control table's control structures, the kernel variables used to reference them will also need to be updated using the same methods described previously. If not re-created, ancillary structures may need to be re-initialized in order to remove any reference to the previous structure(s).

Following creation and duplication, any redundant free memory can be released back to the kernel's free memory pool. This memory can include the just replaced array if it had been dynamically allocated, the old kernel identifier mapping table if one had previously been in effect and any working, and any ancillary storage that may have been acquired.

[10] Releasing the modification-lock allows other users of the specified subsystem to once again access the kernel routines associated with that subsystem.

FIG. 5 is a pseudo-code listing (using the C programming language syntax) for dynamically altering a system resource control table. The example of FIG. 5 uses an existing system modification lock and does not require the creation of any new data structures.

FIGS. 6a through 6d is a pseudo-code listing (also using C syntax) for dynamically altering a system resource control table which acquires a new lock and creates a new system resource control and mapping tables.

4.3 An Illustrative Modification-Lock Embodiment

As an enhancement to the method described above, a method of imposing a modification-lock for a specified resource control data table comprises the following operations:

(a) creating a lock-structure having a held-indicator field [11] and one or more defer queue data structures [12];

(b) initializing the lock-structure [13];

(c) acquiring ownership of the modification-lock structure in exclusive access mode; and (d) intercepting a function call [14] directed to the specified resource control data table.

NOTES

[11] A held-indicator field is used to indicate if one or more application programs own the modification-lock.

[12] A defer queue data structure is used to store identifiers to one or more application programs waiting for ownership of the modification-lock.

[13] Initialization of a lock-structure is done by the operating system.

[14] In the current context, "intercepting a function call" means preventing the originarily targeted function from being executed in the ordinary sequential order so that additional operations can be performed on the function call's parameter list prior to its execution by an intercept function such as function. Interception may, optionally, include the execution of the originally target function after a specified preprocessing function. (See discussion below regarding modification-lock details.)

4.4 Modification-Lock Details

Consider an "alter" function call to the IPC subsystem specifically directed to semaphore processing. The system call routine will invoke the intercept function because the systent table has been hooked, see FIG. 4. (This operation is known as "intercepting" a function call.) Once invoked, the intercept function will first attempt to acquire the intercept lock in shared mode (it is at this point that requesters of the semaphore subsystem are blocked if the lock is held write exclusive by an alteration in process). The kernel identifier passed to the intercept function via the system call is checked against a mapping table to determine if it needs to be replaced by an updated kernel identifier.

In order to enforce any existing access rules, the specified resource control table's semid_ds control structures' may need to be accessed to verify the validity of certain requests. If this is required the intercept function must be cognizant of static to dynamic array conversion in order to properly access the current valid array. (See discussion below.)

Next, the intercept shared lock is released and the function that was formerly (i.e., before hooking) addressed by the system table is invoked with the possibly updated parameters. Normal kernel processing of the system call is performed until the kernel function exits and the intercept function again gains control. Once regaining control from the kernel function, the intercept function can examine the kernel function's result code to determine if any further post-processing of the requested function's parameters or mapping table is required.

There are at least four conditions that require post-processing. In each case an intercept lock is acquired in either shared or exclusive write mode depending on whether the mapping table is to be read only or altered:

1. The function request was for access to a semaphore set and the returned kernel identifier matches an existing mapping table entry (i.e. the semaphore set was in existence at the time the alter function was executed). In this case, the original kernel identifier (from the mapping translation table) is placed in the return parameter list in place of the new kernel identifier in order to assure that all applications are presented with the same kernel identifier for a given set of resources (semaphores in this example).

2. The function request created a new semaphore set and kernel identifier, but the new kernel identifier is the same as an existing old kernel identifier in the mapping table. Since the kernel identifier must be unique in the system, the new kernel identifier must be altered to be made unique. This is accomplished by incrementing the sequence number in the semid_ds structure assigned to control this set of semaphores until a unique kernel identifier is generated.

3. The function request was to delete a kernel identifier from the system and it was successful. If the deleted kernel identifier is one of the kernel identifier being mapped, then the mapping translation table entries referring to the kernel identifiers (old and new) should be set to the not-in-use state.

4. The mapping translation table has no valid entries in it and can be removed from the processing logic and its storage returned to the kernel free memory pool.

After the above required processing is complete, the intercept lock is released and the intercept logic exits which, in effect, rejoins the normal kernel logic flow.

4.5 Static to Dynamic Conversion of Resource Control Tables

An illustrative computer executed method to convert a static type data structure, referred to as the targeted data structure, used by an application program [15] to a dynamic type data structure [16], where the static type data structure was created during the application's compile or assembly phase, comprises the following operations:

(a) acquire a synchronization lock [17] to prevent another application program from accessing the target data structure, (b) creating a new dynamic type data structure [18], the new dynamic type data structure having an address, (c) locating in the application program an instruction that provides an address to the target (static) data structure, (d) modifying the located instruction [19] from an address-generating-instruction to a load-from-generated-address instruction, and (e) placing the address of the new dynamic type resource control table into the location specified by the modified instruction [20].

NOTES

[15] See note [1].

[16] See discussion of static and dynamic allocation in the 'Background' section.

[17] Execution of this method assumes that all necessary synchronization primitives have been acquired in an exclusive state; this ensures no concurrently executing application program can reference the targeted (static) data structure.

[18] See discussion in the 'Background' section regarding dynamic allocation techniques.

[19] To modify access to the target (static) array, the intercept program logic (e.g., 420) has to alter or update the existing machine executable instructions in the logic routines that reference the (static) target data structure. The first step in this operation is to verify that the instructions that need to be altered are resident at the locations where they are expected to be and are exactly the instruction that is expected at that location. Verification depends on prior knowledge of these instructions and their locations by the program developer implementing this technique. This knowledge may be gleaned from the generated machine language listings when the source code was compiled or from inspecting the machine language of the compiled application program through various commonly available applications such as "adb" and "crash" in a Unix system, "XDC" in a "MVS" system, or "SOFTICE" in a "DOS" or "WINDOWS" system, or various other development platform debuggers. Once verification is complete and successful, the machine executable instructions are changed to instructions that will treat the originally targeted static array as a dynamic array.

In some implementations, a common memory location is used as a reference point from which other variables are located by some offset from this point. This technique is commonly referred to as using global data pointer(s). In these implementations, it is common that a single instruction can be altered to a different form in-place to effect the desired static-to-dynamic modification results. For example, in System/370 type architectures the instruction sequence coded as:

L Rn,=A(name) 'Rn' is the designation of the target register and '=A(name)' specifies a memory location where a link editor stored the address of the variable 'name,'

LA Rx, D(X, Rn) 'Rx' is the designation of the target register, 'D' is a displacement value ($2^{12}$), 'X' is an index register designation and 'Rn' is a base register designation previously loaded with the address of one of the global data pointers;

would have its LA-instruction modified by the inventive method to:

L Rx, D(X, Rn) The same definitions as above apply.

Another architecture which uses the global data pointer technique is the PA-RISC precision architecture. In these architectures, the instruction sequence coded as:

LDIL I, Rn 'I' is an immediate value of 21 bits and is used as the high order 21 bits of an address being constructed in the designated target register, Rn;

or

ADDIL I, Rn 'I' is an immediate value of 21 bits that is treated as a high order 21 bit value and added to the contents of the register designated by Rn and the result is placed in register 1, and LDO D(Rn), Rt 'D'is a displacement value ($2^{14}$), 'Rn' is the base register designation previously loaded with the address of one of the global data points (using one of the methods immediately above, and 'Rt' is the designation of the target register for the result address;

would have the LDO instruction modified by the inventive method to:

LDW D(Rn), Rt See operand definitions above.

The effect of the above address-generating instructions (i.e., the original instructions) is to generate an address from their operands (generally a base address plus a specified displacement), and place that computed address into the designated target register. The target register is then used to access the static array at that memory location. The replacement or modified instructions (referred to as load-from-generated address instructions) cause the same address to be calculated, but instead of placing that address into the target register, the instructions access the memory at that address and place the hardware defined size of a word of storage into the designated target register (in many common architectures a hardware defined word is 4 bytes in length, in others a word is 8 bytes in length). The result of the above modification is that a different memory location has been obtained for the location of the array to access.

In other implementations, the name that is used to reference the static table is assigned a value which corresponds to its memory location (address). This address is generally assigned during the linking phase of executable program creation. In these implementations, specific assembler instructions cause the address value to be loaded or created in the target register. For example, in SPARC type architectures the instruction sequence coded as:

sethi % hi(table), Rn '% hi' is a macro that extracts the high order 22 bits of the address value and inserts them into the high order 22 bits of the target register (Rn), and ADD Rn, % lo(table), Rt or OR Rn, % lo(table), Rt 'Rn' is the target register of the previous instruction to which the results of the '% lo(table)' instruction will be logically OR'ed or ADD'ed, '% lo(table)' will extract the low order 10 bits of the address value of sampletable, and 'Rt' is the target register for the result of the address creation;

would have the above ADD or OR instruction modified by the inventive method to:

LD [Rn+% lo(table)], Rt The construct '[Rn +% lo(table)]' computes the address of 'table' and loads the word at that address into the designated target register, Rt.

The effect of the above modification is that in their original form, the instructions generate an address from the operands (link editor assigned address value) directly and place that computed address into the designated target register. The target register is then used to access the static array at that memory location. In its modified form, the new instruction causes the same address to be calculated, but instead of placing that address into the target register, will access the memory at that address and place the hardware defined size of a word of storage into the designated target register. Thus a different memory location has been obtained for the location of the array to access.

[20] After the machine language instructions have been modified as described above, the address of the new dynamic data structure (array), which has been acquired from the free memory pool, is stored into the first word of the memory location (address) previously occupied by the static array. (It may be necessary in some implementations to "lock" or "page fix" the new dynamic data structure at its memory location(s) in order to insure that page faults do not occur in critical code paths where page faults are not expected or cannot be properly handled.)

Modification of instruction op-codes or hooking of in-line code paths as previously described may be accomplished, for example, by two techniques. The first technique is accomplished via hardware instructions that allow the program to write directly to physical storage, bypassing the address translation hardware logic (known commonly as dynamic address translation or hardware address translation). In this method, the physical address of the new dynamically created data structure is acquired through the use of instructions or existing function calls provided by the operating environment. Once the physical address has been acquired, the modified instruction (see discussion above) is written to that main memory location and the instruction cache is flushed to eliminate any residual information about that address in the cache. This operation causes the modified instruction to be fetched from main memory on its next reference. The flush operation must be one that causes all CPUs (central processing units) in a multi-CPU configuration to flush their caches at substantially the same time. This may involve delaying continuing execution of the modified program code until such time as all caches have been flushed (this time delay is normally a guaranteed time within which all CPUs will have flushed their cache).

Another technique is to programmatically alter the information in the dynamic address translation, hardware address translation, or equivalent hardware translation tables to allow direct storage of the modified instruction. This may be required due to the fact that in many implementations, executable code segments are treated as read-only segments of memory. By altering the translation tables, the write is temporarily allowed and then the translation tables are set back to their initial state. Flushes of the caches, as described above, may be required also, but on many architectures the required synchronization of the caches is handled by the hardware in a multi-CPU environment when the cache is written into in order to insure that all CPUs see that 'new' data in memory.

Whichever technique is used, the result is that the first word (as defined by the specific hardware/architecture) of the address that was the original array, is now be referenced by the modified executable machine language code to pick up the address of where a new dynamic array resides.

Once performed, any future alterations (i.e., to resize the array) during the execution lifetime of a calling application program, need only update the first word at the address of the original table to reference a new array. The methods will need to be re-performed if, for example, the program is terminated and re-initialized as reinitialization generally causes an original copy of the executable program from file storage to be loaded into memory. Thus, any modifications made by the inventive method will have been lost.

FIG. 7a through 7e comprise a pseudo-code listing (in C programming language syntax) for dynamically altering a system resource control table which converts a static type data structure to a dynamic type data structure.

4.6 Program Storage Device

Any of the foregoing variations may be implemented by programming a suitable general-purpose computer. The programming may be accomplished through the use of a program storage device readable by the computer and encoding a program of instructions executable by the computer for performing the operations described above. The program storage device may take the form of, e.g., one or more floppy disks; a CD ROM or other optical disk; a magnetic tape; a read-only memory chip (ROM); and other forms of the kind well-known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions is immaterial here.

4.7 Remarks

While the above specific embodiments are directed at modifying a Unix kernel to allow dynamic alteration of system resources, it will be appreciated by one of ordinary skill having the benefit of this disclosure that the methods of altering resource control tables are applicable to any operating system. It will be further recognized that the method of converting a static type data structure into a dynamic data structure is broadly applicable to both operating system and user applications.

Thus, numerous variations from the foregoing illustrations are possible without departing from the inventive concept described herein. Accordingly, it is the claims set forth below, and not merely the foregoing illustration, which are intended to define the exclusive rights claimed in this application program.

What is claimed is:

1. A computer executed method for dynamically altering one or more operating system kernel resource control tables for a specified subsystem in response to a request from an application program wherein at least one of said resource control tables, referred to as the specified resource control table, has a plurality of entries, each entry having associated therewith an existing kernel identifier, said method comprising:

(a) imposing a modification lock to said specified subsystem;

(b) modifying said one or more kernel resource control tables associated with said specified subsystem; wherein said modifying operation includes the following actions:

(1) creating a new resource control table having a plurality of entries, each entry having a new kernel identifier that identifies specific resource control data;

(2) copying, from the specified resource control table to the new resource control table, those entries in said specified table that represent in-use resource control data;

(3) creating a mapping table having respective entries, referred to as mapping-table entries, wherein each mapping-table entry includes the existing kernel identifier for a specific in-use resource control data and the new kernel identifier for that in-use resource control data;

(4) intercepting a function call that includes a reference to a kernel identifier;

(5) determining whether the function call includes a reference to a specified one of said existing kernel identifiers, and if so, then replacing said reference with a reference to the new kernel identifier that corresponds to said specified one of said existing kernel identifiers; and (c) releasing said modification lock.

2. A computer executed method for dynamically altering one or more operating system kernel resource control tables for a specified subsystem in response to a request from an application program wherein at least one of said resource control tables is a static type data structure, referred to as the specified resource control table, has a plurality of entries, said method comprising:

(a) imposing a modification lock to said specified subsystem;

(b) modifying said one or more kernel resource control tables associated with said specified subsystem; wherein said modifying operation includes the following actions:

(1) creating a new dynamic type resource control table having a plurality of entries, said new dynamic type resource control table having an address;

(2) copying, from the specified resource control table to the new dynamic type resource control table, those entries in said specified table that represent in-use resource control data;

(3) locating in said application program an instruction that provides an address to said specified resource control table;

(4) modifying said located instruction from an address-generating-instruction to a load-from-generated-address instruction;

(5) placing the address of the new dynamic type resource control table into the location specified by modified instruction; and (c) releasing said modification lock.

3. A computer executed method for dynamically altering one or more operating system kernel resource control tables for a specified subsystem in response to a request from an application program wherein at least one of said resource control tables is a static type data structure, referred to as the specified resource control table, has a plurality of entries, each entry having associated therewith an existing kernel identifier said method comprising:

(a) imposing a modification lock to said specified subsystem;

(b) modifying said one or more kernel resource control tables associated with said specified subsystem; wherein said modifying operation includes the following actions:

(1) creating a new dynamic type resource control table having a plurality of entries, each entry having a new kernel identifier that identifies specific resource control data;

(2) copying, from the specified resource control table to the new dynamic type resource control table, those entries in said specified table that represent in-use resource control data;

(3) creating a mapping table having respective entries, referred to as mapping-table entries, wherein each mapping-table entry includes the existing kernel identifier for a specific in-use resource control data and the new kernel identifier for that in-use resource control data;

(4) intercepting a function call that includes a reference to a kernel identifier;

(5) determining whether the function call includes a reference to a specified one of said existing kernel identifiers, and if so, then replacing said reference with a reference to the new kernel identifier that corresponds to said specified one of said existing kernel identifiers;

(6) locating in said application program an instruction that provides an address to said specified resource control table;

(7) modifying said located instruction from an address-generating-instruction to a load-from-generated-address instruction;

(8) placing the address of the new dynamic type resource control table into the location specified by modified instruction; and (c) releasing said modification lock.

4. A computer executed method to convert a static type data structure used by an application program to a dynamic type data structure, said static type data structure having been created at compile time of said application program, said method comprising:

(a) acquiring a synchronization lock to prevent another application program from accessing said static type data structure;

(b) creating a new dynamic type data structure, said new dynamic type data structure having an address;

(c) locating in said application program an instruction that provides an address to said static type data structure;

(d) modifying said located instruction from an address-generating-instruction to a load-from-generated-address instruction; and (e) placing the address of the new dynamic type data structure into the location specified by the modified instruction.

5. The method of claim 4 wherein said operation of creating a new dynamic type data structure is followed by copying one or more entries in said static type data structure into the new dynamic type data structure.

6. A program storage device that is readable by the computer system of a specified one of claims 1, 2, 3, 4, or 5, said program storage device having encoded therein a program of instructions that includes instructions for executing the operations of said specified one of the claims 1, 2, 3, 4, or 5.

7. A computer executed method for dynamically altering an operating system kernel resource control table having a plurality of entries, each entry having associated therewith an existing kernel identifier, for a specified subsystem in response to a request from an application program, said method comprising:

(a) imposing a modification lock to said specified subsystem;

(b) modifying said kernel resource control tables associated with said specified subsystem by:

(1) creating a new resource control table having a plurality of entries, each entry having a new kernel identifier that identifies specific resource control data;

(2) copying, from the specified resource control table to the new resource control table, those entries in said specified table that represent in-use resource control data;

(3) creating a mapping table having respective entries, referred to as mapping-table entries, wherein each mapping-table entry includes the existing kernel identifier for a specific in-use resource control data and the new kernel identifier for that in-use resource control data;

(4) intercepting a function call that includes a reference to a kernel identifier; and (5) determining whether the function call includes a reference to a specified one of said existing kernel identifiers, and if so, then replacing said reference with a reference to the new kernel identifier that corresponds to said specified one of said existing kernel identifiers;

(c) releasing said modification lock.

\* \* \* \* \*